June 28, 1938.  C. MICHELSON  2,122,069
TOOL RACK FOR MEAT BLOCKS
Filed Aug. 3, 1936
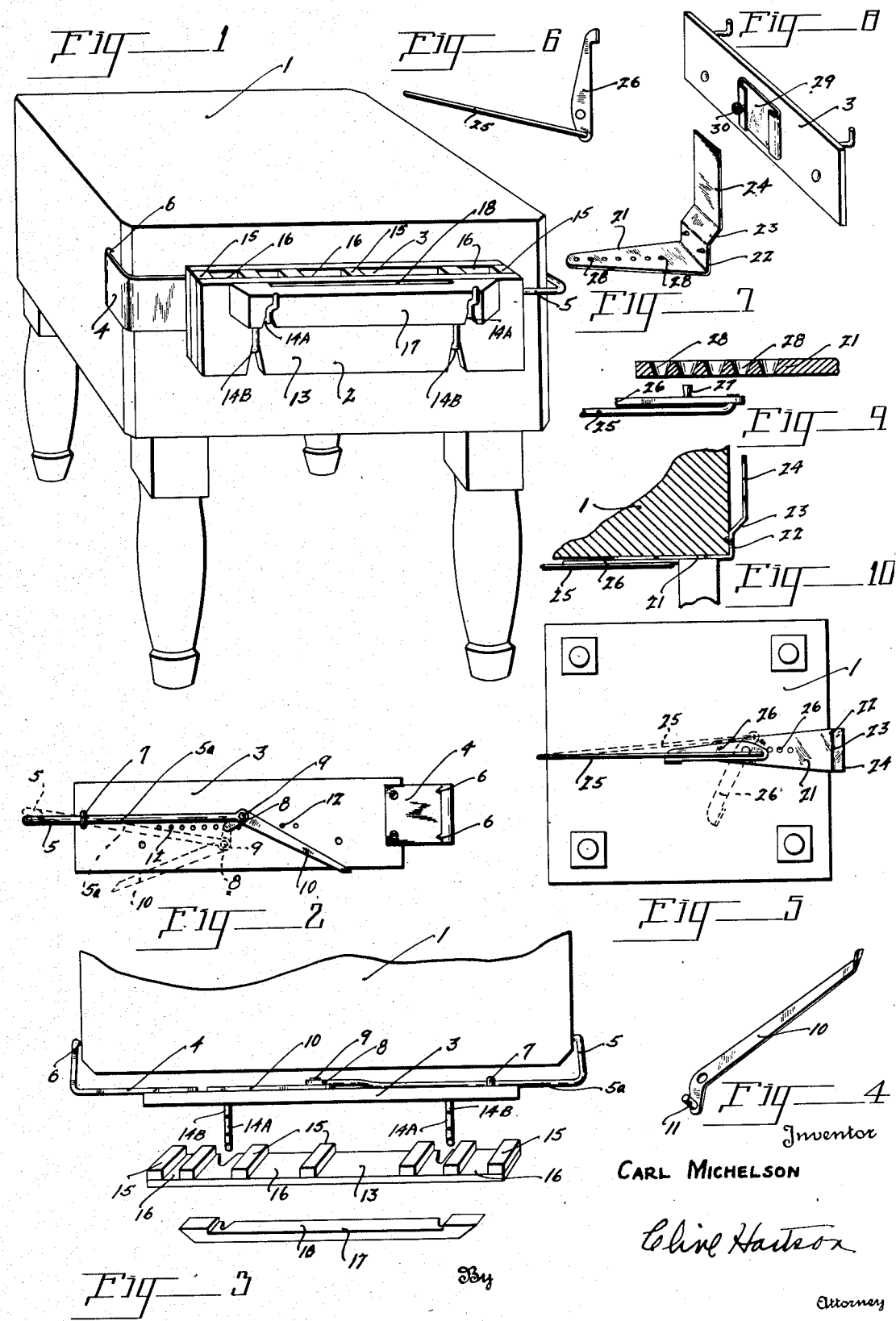
Inventor
CARL MICHELSON Patented June 28, 1938

2,122,069

UNITED STATES PATENT OFFICE 2,122,069

TOOL RACK FOR MEAT BLOCKS

Carl Michelson, Klamath Falls, Oreg.

Application August 3, 1936, Serial No. 94,027

3 Claims. (Cl. 211—60)

This invention relates to tool racks and is particularly adapted to be used in connection with meat blocks.

On the present day meat block it is customary to have a fixed rack for holding knives, cleavers, meat saws and so forth. Due to the fact that it is solidly mounted to the block unsanitary conditions result. Further the rack is seldom changed to any of the other sides of the block so that one corner or one side of the block is worn down, while the remaining top of the block is practically untouched by the meat cutting operation, therefore, in view of the above objections of the present day tool rack of the type that are solidly fixed to the block and require special tools to apply them to the block, the following objects of my invention will be apparent.

The primary object of my invention is to provide a tool rack for meat blocks and the like that can be clamped to the block without the use of any tools whatsoever.

Another object of my invention is to provide a tool rack that can be completely disassembled permitting complete sterilizing from time to time.

A further object of my invention is to provide a tool rack for meat blocks that can be adapted to any side of a block by a simple manipulation and that will fit universally any size block.

A still further object of the invention is to provide a quick clamp-on tool rack for meat blocks of simple construction and economical to manufacture.

These and other incidental objects will be apparent in the following specification and drawing.

Referring to the drawing:

Figure 1 is a perspective view of a meat block, having one of my new and improved tool racks clamped thereon.

Figure 2 is a rear view of a tool rack, looking from the side next to the block and illustrating the clamping mechanism.

Figure 3 is a fragmentary plan view of the block, having the main body of the tool rack clamped thereon, and illustrating the rack being disassembled for the purpose of cleaning.

Figure 4 is a perspective view of the locking lever used for clamping the rack upon the block.

Figure 5 is another preferred form of clamping mechanism, showing the block in an inverted plan view, as this clamp is secured to the underneath side of the block.

Figure 6 is a part of the locking assembly shown in Figure 5.

Figure 7 is the bracket associated with the locking assembly in Figure 6 and the main body of the tool rack shown in Figure 8.

Figure 8 is the main body of the tool rack.

Figure 9 is a fragmentary sectional view of the bracket shown in Figure 7 and a fragmentary side view of the clamping arrangement shown in Figure 6, the same illustrating the means of connecting one with the other.

Figure 10 is a fragmentary sectional side view of a meat block, having the bracket and clamping means connected thereto.

In the drawing:

1 is a meat block having a tool rack 2 clamped thereon. The tool rack has a main body portion 3 provided with a hook like clamping portion 4, solidly fixed to one end and an adjustable hook 5 projectible from the other end for engaging opposite sides of block 1. Clamp 4 has sharpened points 6 for gripping the block and to prevent the body portion of the tool rack from rocking. Hook 5 has a shank 5A which rides in an eye screw 7 secured in the body 3. The end 8 of shank 5A is pivotally connected by pin 9 to lever 10. Lever 10 has a pin 11 for engaging one of the holes 12 within the body 3.

In the position shown in Figure 2 the hook 5 and the lever 10 are shown in locked position. The dotted outline indicates the released or unlocked position. In order to fit the tool rack to any size block, the pin 11 is inserted in a hole 12 that will provide the proper spacing between the hooks 5 and 6 in accordance with the width of the block. The lever 10 is then forced from the dotted position to the full line position in Figure 2, this decreasing the distance between the hooks and causing them to grip the sides of block 1.

In order to keep the tool rack in a sanitary condition, the same may be dismantled as shown in Figure 3. The spacer and tool holder 13 is removably mounted to the body 3 by arms 14 having offsets 14A and 14B. Spacer bars 15 provide pockets 16 for cutting tools. A second spacer and tool holder 17 is also mounted to the arms 14 and provides a pocket 18 for holding a cleaver blade. Holders 13 and 17 have slots to allow the holders to rest on their respective offsets, the last offset extending upward to provide means for supporting meat saws.

Referring to Figures 5, 6, 7, 8, 9 and 10, I show a modified embodiment of supporting clamp. A main clamp body 21 has a right angle bend at 22, an offset 23 and an upward extension 24. A clamping hook 25 engages one end of the block as shown in Figure 5, while the angle 22 engages the opposite side of the block. A clamping lever 26 is pivotally connected to the hook 25 and has a pin 27 for seating in a preselected hole 28 in the body 21, is used for clamping the assembly to the block. The function of hook 25 is the same as hook 5; lever 26 the same as lever 10; body 21 and holes 28 the same as body 3 and holes 12. These elements are mounted to the underside of block 1 with extension 24 projecting upwardly at one side. The pin 27 is tapered as shown in Figure 9 for engaging the tapered holes 28, this arrangement holding the same in place while the clamping operation is being performed. However, the largest diameter of the pin is smaller than the smallest diameter of the holes. A clamp 29 is fixed to the back of the tool rack 3 and engages the upright bracket 24. The set screw 30 secures the rack at a desired height.

As a specific form of construction has been described and illustrated herein, it is desired to be understood that the same may be varied, within the scope of the appended claims, without departing from the spirit of the invention.

What is claimed to be new is:

1. A tool rack for meat blocks and supporting means therefor, comprising a supporting body having an angularly disposed engaging member at one end and a series of spaced holes, a hook having an elongated shank, a lever pivotally connected to the end of the shank, a pin projecting from the lever and spaced from said pivotal connection, said pin seating in one of the aforesaid holes and providing a pivotal connection between said body and lever, said lever when pivoted in one direction increasing the distance between hook and angularly disposed member, and when pivoted in the opposite direction decreasing said distance and the hook and angularly disposed member when the distance is decreased gripping opposite sides of a support, a tool rack detachably supported by said body, and a slidable connection between said supporting body and tool rack for adjusting the height of the rack.

2. A tool rack for meat blocks and supporting means therefor, comprising a supporting body having an angularly disposed engaging member at one end and a series of spaced holes, a hook having an elongated shank, a lever pivotally connected to the end of the shank, a pin projecting from said lever and spaced from said pivotal connection, said pin seating in one of the aforesaid holes and providing a pivotal connection between said body and lever, said lever when pivoted in one direction increasing the distance between hook and angularly disposed member, and when pivoted in the opposite direction decreasing said distance and the hook and angularly disposed member when the distance is decreased gripping opposite sides of a support, said body having an upwardly extending member, a tool rack, and means vertically adjustable upon said upwardly extending member supporting said tool rack.

3. A tool rack for meat blocks, comprising a support member, a body supported thereby, a pair of spaced arms with upwardly turned portions projecting from one side thereof, and spacers provided with tool recesses removably seated on said arms between their upturned portions and said body.

CARL MICHELSON.